United States Patent
Sakamoto et al.

(10) Patent No.: US 11,713,709 B2
(45) Date of Patent: Aug. 1, 2023

(54) NOZZLE DEVICE AND EXHAUST TURBOCHARGER

(71) Applicant: MITSUBISHI HEAVY INDUSTRIES ENGINE & TURBOCHARGER, LTD., Sagamihara (JP)

(72) Inventors: Keigo Sakamoto, Tokyo (JP); Eigo Katou, Tokyo (JP); Tsuyoshi Sakurai, Tokyo (JP); Shigeyoshi Sakuma, Tokyo (JP); Yosuke Dammoto, Sagamihara (JP); Yoji Akiyama, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 38 days.

(21) Appl. No.: 17/442,025

(22) PCT Filed: Mar. 28, 2019

(86) PCT No.: PCT/JP2019/013554
§ 371 (c)(1),
(2) Date: Sep. 22, 2021

(87) PCT Pub. No.: WO2020/194651
PCT Pub. Date: Oct. 1, 2020

(65) Prior Publication Data
US 2022/0170414 A1 Jun. 2, 2022

(51) Int. Cl.
*F02B 37/24* (2006.01)
*F16B 17/00* (2006.01)

(52) U.S. Cl.
CPC ............ *F02B 37/24* (2013.01); *F16B 17/006* (2013.01)

(58) Field of Classification Search
CPC ......... F02B 37/24; F16B 17/006; Y02T 10/12
See application file for complete search history.

(56) References Cited

U.S. PATENT DOCUMENTS 8,061,976 B2 * 11/2011 Hall ................... B23P 19/084
                                                    415/164
8,376,695 B2 *  2/2013 Scholz ................ F01D 17/165
                                                    415/214.1
(Continued)

FOREIGN PATENT DOCUMENTS

CN           101173616 A  *  5/2008    ........... F01D 17/165
CN           104295326 A  *  1/2015
(Continued)

OTHER PUBLICATIONS

Li Juntao; CN104295326 English Translation; Jan. 21, 2015 (Year: 2015).*
(Continued)

*Primary Examiner* — Jesse S Bogue
(74) *Attorney, Agent, or Firm* — Birch, Stewart, Kolasch & Birch, LLP

(57) ABSTRACT

A nozzle device according to some embodiments includes an annular nozzle plate, an annular nozzle mount defining a nozzle flow passage between the nozzle mount and one surface of the nozzle plate, at least one nozzle support coupling the nozzle plate and the nozzle mount, and fixed to at least the nozzle plate by caulking, and at least one nozzle vane supported between the nozzle plate and the nozzle mount. The nozzle plate has a through hole into which an end portion of the at least one nozzle support is inserted. The through hole includes a straight portion extending from the one surface toward another surface of the nozzle plate, an enlarged diameter portion formed on a side of the another surface of the nozzle plate and having a larger diameter than the straight portion, and a relief processing portion which is formed in a part of the straight portion continuing into the enlarged diameter portion and has a larger diameter than
(Continued)

another part of the straight portion where the relief processing portion is not formed.

13 Claims, 7 Drawing Sheets

(56) References Cited

U.S. PATENT DOCUMENTS

| | | | | |
|---|---|---|---|---|
| 8,545,172 | B2* | 10/2013 | Severin | F01D 11/005 |
| | | | | 415/164 |
| 8,932,008 | B2* | 1/2015 | Boening | F16B 35/041 |
| | | | | 415/164 |
| 9,771,939 | B2* | 9/2017 | Tashiro | F01D 17/165 |
| 10,648,360 | B1* | 5/2020 | Musil | F02C 6/12 |
| 2011/0296829 | A1* | 12/2011 | Hayashi | F01D 17/165 |
| | | | | 60/602 |
| 2015/0211538 | A1* | 7/2015 | Aiba | F04D 27/002 |
| | | | | 415/146 |
| 2019/0136756 | A1 | 5/2019 | Itou | |
| 2020/0408142 | A1 | 12/2020 | Sakamoto et al. | |

FOREIGN PATENT DOCUMENTS

| | | | | |
|---|---|---|---|---|
| CN | 104937235 A | * | 9/2015 | ........... F01D 17/165 |
| CN | 105221189 A | * | 1/2016 | |
| WO | WO 2017/175615 A1 | | 10/2017 | |
| WO | WO 2018/167931 A1 | | 9/2018 | |

OTHER PUBLICATIONS

International Search Report for PCT/JP2019/013554 dated Jun. 25, 2019.
Written Opinion of the International Searching Authority for PCT/JP2019/013554 dated Jun. 25, 2019.

* cited by examiner

View A

B-B cross-section

NOZZLE DEVICE AND EXHAUST TURBOCHARGER

TECHNICAL FIELD

The present disclosure relates to a nozzle device and an exhaust turbocharger including the nozzle device.

BACKGROUND

An exhaust turbocharger supercharges air supplied to an engine, by using energy of an exhaust gas discharged from the engine. Conventionally, the exhaust turbocharger is used for, for example, a vehicle diesel engine, and some exhaust turbocharger is of a variable-displacement type including a variable nozzle device. The exhaust gas passes through a scroll flow passage formed in a turbine housing, and is then supplied to a turbine rotor after passing through a nozzle flow passage defined by the variable nozzle device. The variable nozzle device is supported in a state where a nozzle mount and a nozzle plate are spaced apart from each other by a nozzle support, and the nozzle flow passage is formed between the nozzle mount and the nozzle plate, and the nozzle flow passage is provided with a nozzle vane.

Patent Document 1 discloses that a thermal deformation amount is decreased by forming a nozzle plate to be thicker than a nozzle mount, thereby reducing a shearing force and a bending moment applied to the nozzle support, and preventing damage to the nozzle plate and the nozzle support. Patent Document 1 also discloses that an end portion of the nozzle support is fixed, by caulking, to a through hole formed in the nozzle plate or the nozzle mount.

CITATION LIST

Patent Literature

Patent Document 1: WO2018/167931A

SUMMARY

Technical Problem

If a nozzle support is fixed to the nozzle plate or a nozzle mount by caulking, a part of the nozzle support continuing into a caulking portion deformed by caulking processing may be deformed to a side of a surface that forms a through hole formed in the nozzle plate or the nozzle mount, and may be in contact with the through hole forming surface. In this case, a vibration load of the nozzle plate or the nozzle mount is loaded on the contact section, which may cause fretting fatigue in the nozzle plate and may cause a crack originating from an end portion of the contact section. If the fretting fatigue crack is caused, a fatigue limit of the nozzle support is decreased significantly.

An object of some embodiments according to the present disclosure is to suppress occurrence of fretting fatigue in the nozzle support fixed to the nozzle plate and the nozzle mount by caulking.

Solution to Problem (1) A nozzle device according to an embodiment includes an annular nozzle plate, an annular nozzle mount defining a nozzle flow passage between the nozzle mount and one surface of the nozzle plate, at least one nozzle support coupling the nozzle plate and the nozzle mount, and fixed to at least the nozzle plate by caulking, and at least one nozzle vane supported between the nozzle plate and the nozzle mount. The nozzle plate has a through hole into which an end portion of the at least one nozzle support is inserted. The through hole includes a straight portion extending from the one surface toward another surface of the nozzle plate, an enlarged diameter portion formed on a side of the another surface of the nozzle plate and having a larger diameter than the straight portion, and a relief processing portion which is formed in a part of the straight portion continuing into the enlarged diameter portion and has a larger diameter than another part of the straight portion where the relief processing portion is not formed.

In the above configuration (1), the end portion of the nozzle support is inserted into the through hole of the nozzle plate, the end portion of the nozzle support is deformed by caulking processing and contacts the surface forming the above-described enlarged diameter portion, and the nozzle plate and the nozzle support are coupled to each other. With the above configuration (1), since the through hole forms the relief processing portion in the part of the straight portion continuing into the above-described enlarged diameter portion, even if a part (hereinafter, may also be referred to as a "non-caulking portion" to be described later) of the nozzle support which continues into the caulking portion contacting the surface forming the enlarged diameter portion is deformed to the side of the surface forming the through hole in caulking processing, the non-caulking portion does not contact the through hole forming surface. Therefore, there is no contact section to be a starting point for fretting fatigue to occur, making it possible to suppress occurrence of fretting fatigue.

(2) In an embodiment, in the above configuration (1), a distance between a center of the through hole and a surface forming the relief processing portion is larger in a radially inner side than in a radially outer side of the nozzle plate.

With the above configuration (2), since the distance between the center of the through hole and the surface forming the relief processing portion is larger in a radially inner side than in a radially outer side of the nozzle plate, even if the nozzle plate is thermally elongated and increased in diameter under a high-temperature environment, the non-caulking portion does not contact the surface forming the relief processing portion. Thus, it is possible to suppress occurrence of fretting fatigue in the nozzle support.

(3) In an embodiment, in the above configuration (2), a center of the relief processing portion is at a position offset to the radially inner side of the nozzle plate relative to the center of the through hole.

With the above configuration (3), if the center of the relief processing portion is at the position offset to the radially inner side of the nozzle plate, it is possible to easily cut formation of the above-described relief processing portion by a cutting blade with a rotation center thereof is offset to the radially inner side of the nozzle plate relative to the center of the through hole.

(4) In an embodiment, in any one of the above configurations (1) to (3), the relief processing portion has an inner diameter $A_2$ which is not less than $1.1 \times A_1$ and not greater than $1.5 \times A_1$, where $A_1$ is an outer diameter of the nozzle support.

With the above configuration (4), since $A_2/A_1 = 1.1$ to $1.5$, it is possible to avoid contact of the non-caulking portion with the surface forming the through hole without expansion formation of the relief processing portion more than necessary.

(5) A nozzle device according to an embodiment includes an annular nozzle plate, an annular nozzle mount defining a nozzle flow passage between the nozzle mount and one surface of the nozzle plate, at least one nozzle support coupling the nozzle plate and the nozzle mount, and fixed to at least the nozzle plate by caulking, and at least one nozzle vane supported between the nozzle plate and the nozzle mount. The nozzle plate has a through hole into which an end portion of the at least one nozzle support is inserted. The through hole includes a straight portion extending from the one surface toward another surface of the nozzle plate, and an enlarged diameter portion formed on a side of the another surface of the nozzle plate and having a larger diameter than the straight portion. The at least one nozzle support includes a caulking portion which contacts a surface forming the enlarged diameter portion, and a non-caulking portion which is disposed with a gap between the non-caulking portion and a surface forming a part of the straight portion continuing into the enlarged diameter portion.

With the above configuration (5), since the above-described non-caulking portion of the nozzle support has the gap between the non-caulking portion and the surface forming the part of the straight portion continuing into the enlarged diameter portion of the through hole even after caulking processing, there is no contact section to be the starting point for the fretting fatigue to occur. Thus, it is possible to suppress occurrence of fretting fatigue.

(6) In an embodiment, in any one of the above configurations (1) to (5), a surface forming the enlarged diameter portion is formed into a tapered shape.

With the above configuration (6), since the surface forming the enlarged diameter portion is formed into the tapered shape, it is possible to increase the diameter of the caulking portion along the tapered surface of the enlarged diameter portion in caulking processing. Thus, it is possible to reduce a required load applied to the end portion of the nozzle support to form the caulking portion, making it possible to suppress deformation of the non-caulking portion to the side of the through hole forming surface.

(7) In an embodiment, in any one of the above configurations (1) to (6), the nozzle mount is fixed to a bearing housing, and the nozzle plate is supported by the nozzle mount via the nozzle support.

With the above configuration (1), it is to suppress occurrence of fretting fatigue by a vibration load received from the nozzle plate or the nozzle mount, in the nozzle support fixed to the nozzle plate or the nozzle mount by caulking.

(8) In an embodiment, in any one of the above configurations (1) to (7), the nozzle plate has a thermal expansion coefficient which is larger than a thermal expansion coefficient of the nozzle support.

With the above configuration (8), since the thermal expansion coefficient of the nozzle plate is larger than the thermal expansion coefficient of the nozzle support, when the temperatures of the nozzle plate and the nozzle support increase under the high-temperature environment, it is possible to suppress occurrence of backlash between the nozzle plate and the nozzle support.

(9) An exhaust turbocharger according to an embodiment includes the nozzle device according to any one of the above configurations (1) to (8).

With the above configuration (9), it is possible to suppress occurrence of fretting fatigue in the nozzle support disposed in the above-described nozzle device.

Advantageous Effects

According to some embodiments, it is possible to suppress occurrence of fretting fatigue originating from a non-caulking portion which continues into a caulking portion of a nozzle support disposed in a nozzle device.

DETAILED DESCRIPTION

Figure 1:
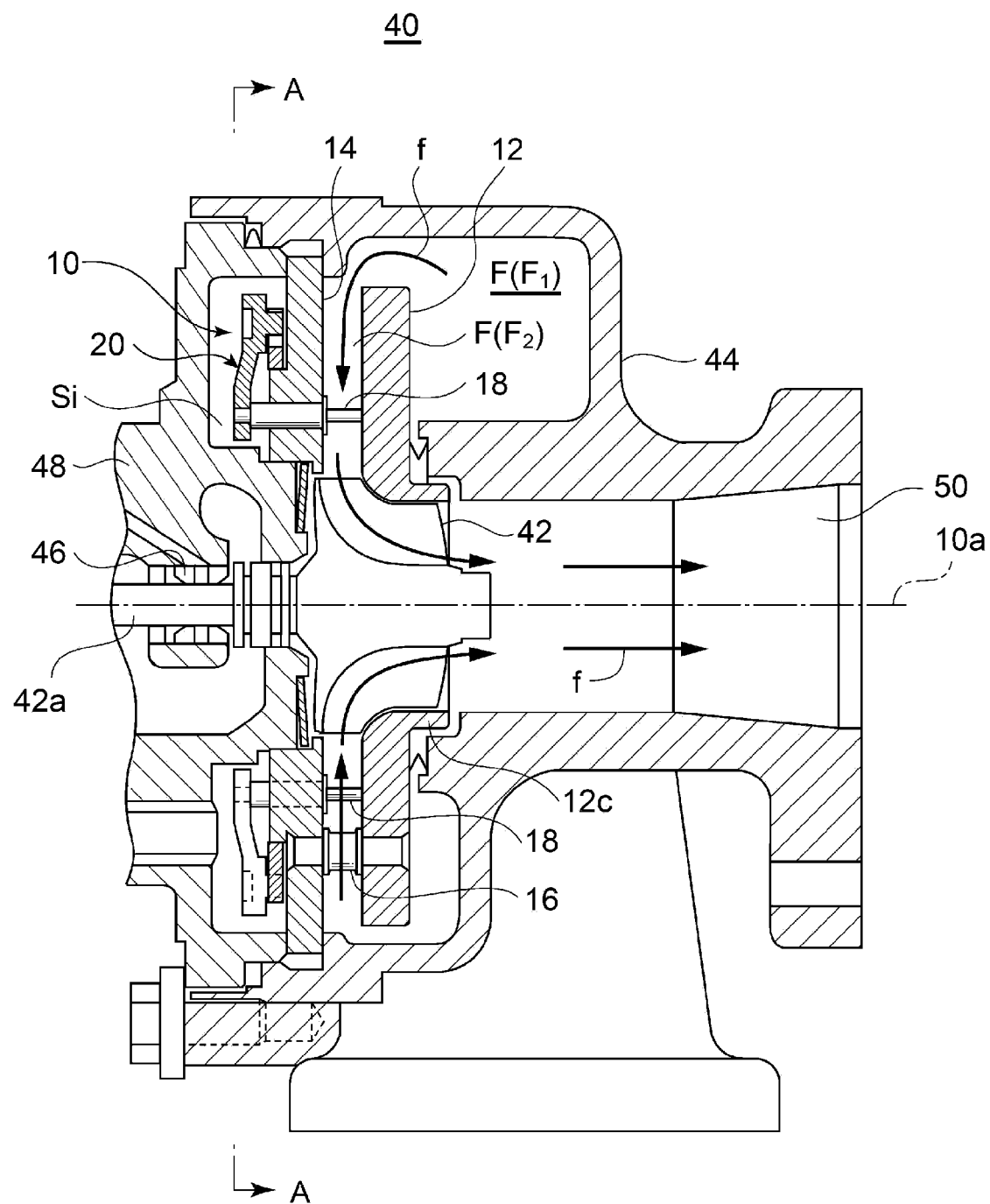
FIG. 1 is a vertical cross-sectional view of a variable-displacement type exhaust turbocharger according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 2:
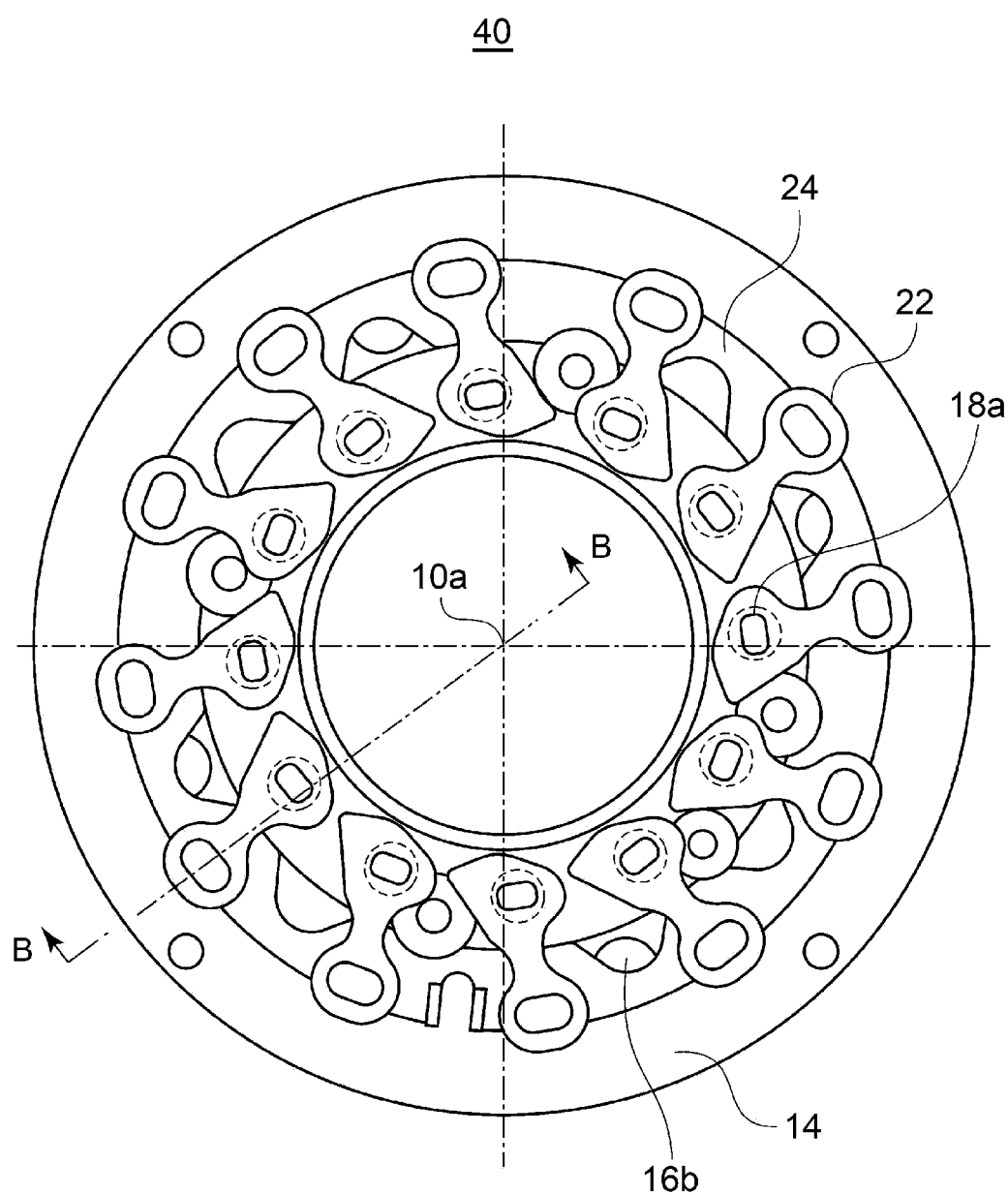
FIG. 2 is a view as seen from the direction of arrow A in FIG. 1.

As shown in FIGS. 1 and 2, a variable-displacement type exhaust turbocharger 40 according to an embodiment includes a turbine housing 44 for internally housing a turbine rotor 42, a bearing housing 48 for internally housing a bearing 46 for rotatably supporting a rotational shaft 42a of the turbine rotor 42, and a variable nozzle device 10 mounted in a combination of the above-described housings. As a coupling means for the turbine housing 44 and the bearing housing 48, for instance, in an example shown in FIG. 1, the turbine housing 44 and the bearing housing 48 are fastened to each other by a fastening means such as a bolt in a state where an outer circumferential edge portion of a nozzle mount 14 to be described later is sandwiched from the right-left direction in FIG. 1. The nozzle mount 14 and an annular groove portion formed in the bearing housing 48 form an interior space Si.

Further, a compressor housing (not shown) is provided at a position opposite to the turbine housing 44 across the bearing housing 48. The compressor housing is coupled to the bearing housing 48 and internally houses a compressor rotor (not shown). The compressor rotor is coupled to the rotational shaft 42a of the turbine rotor 42, rotates in conjunction with a rotation of the rotational shaft 42a, and supercharges air supplied to an engine. Moreover, an exhaust gas flow passage F is formed in the turbine housing 44, and a scroll flow passage F (F$_1$), which communicates with an exhaust manifold (not shown) and through which an exhaust gas discharged from the engine flows, is formed on an outer circumferential side in the turbine housing 44.

The variable nozzle device 10 is placed so that an axis 10a thereof is aligned with an axis of the turbine rotor 42, and is placed on the outer side of a perpendicular direction (up-down direction in FIG. 1) to the axis (a line on the same straight line as the axis 10a of FIG. 1) of the turbine rotor 42 relative to the turbine rotor 42. Then, the variable nozzle device 10 forms a nozzle flow passage F (F$_2$) through which the exhaust gas flows, between the scroll flow passage (F$_1$) and the turbine rotor 42. Each arrow f in FIG. 1 indicates a flow of the exhaust gas. The exhaust gas discharged from the engine passes through the scroll flow passage F (F$_1$), and is then supplied to the turbine rotor 42 after passing through the nozzle flow passage F (F$_2$) defined by the variable nozzle device 10. Subsequently, the exhaust gas is discharged from an exhaust outlet 50 to the outside of the turbine housing 44.

Figure 3:
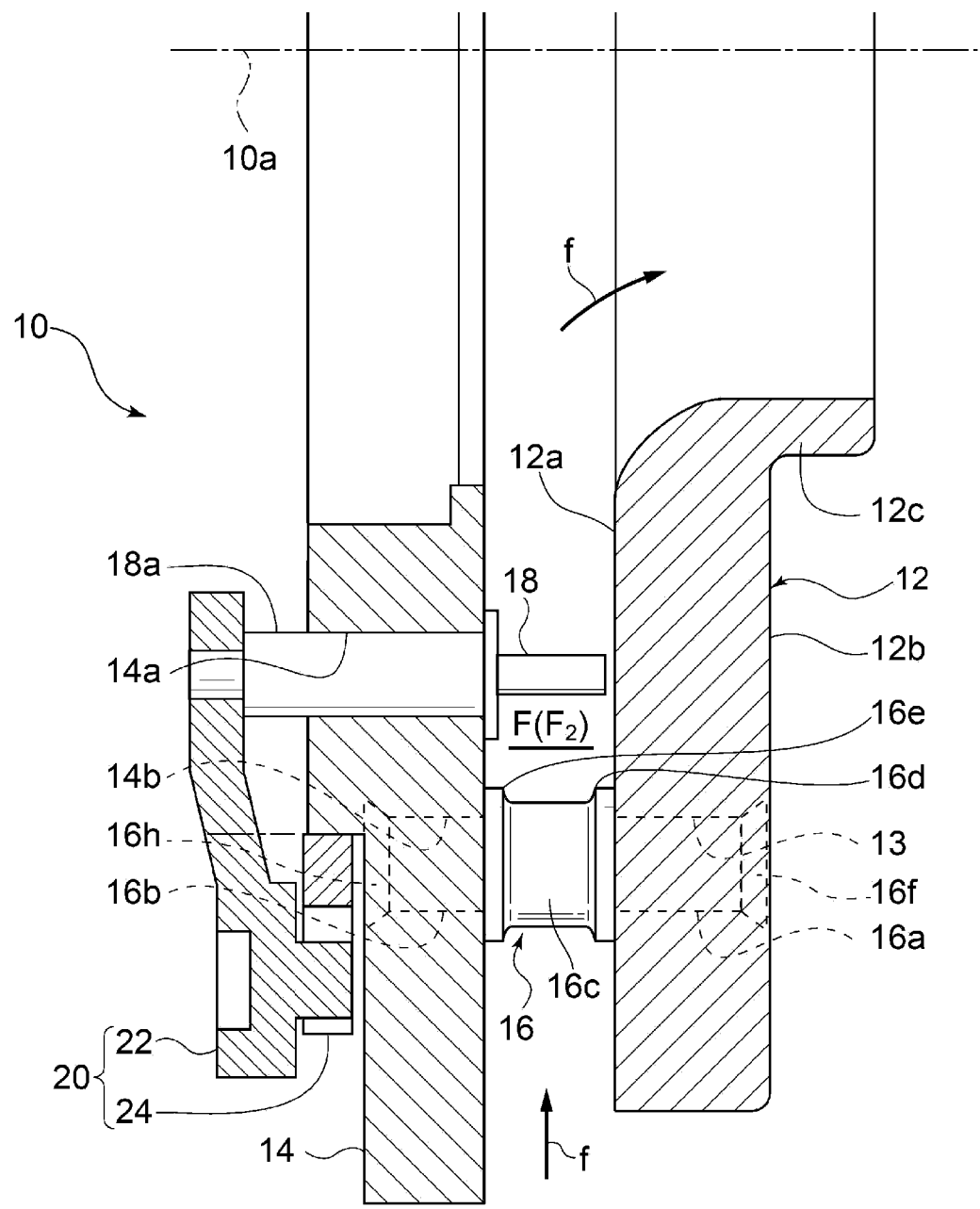
FIG. 3 is a partially enlarged vertical cross-sectional view taken along line B-B in FIG. 2.

As shown in FIG. 3, the variable nozzle device 10 according to an embodiment includes an annular nozzle plate 12, and the annular nozzle mount 14 defining the nozzle flow passage F (F$_2$) between the nozzle mount 14 and one surface 12a of the nozzle plate 12. The nozzle plate 12 and the nozzle mount 14 are coupled by a nozzle support 16. The nozzle support 16 is fixed to at least the nozzle plate 12 by caulking, and at least one nozzle vane 18 is disposed between the nozzle plate 12 and the nozzle mount 14.

Figure 5:
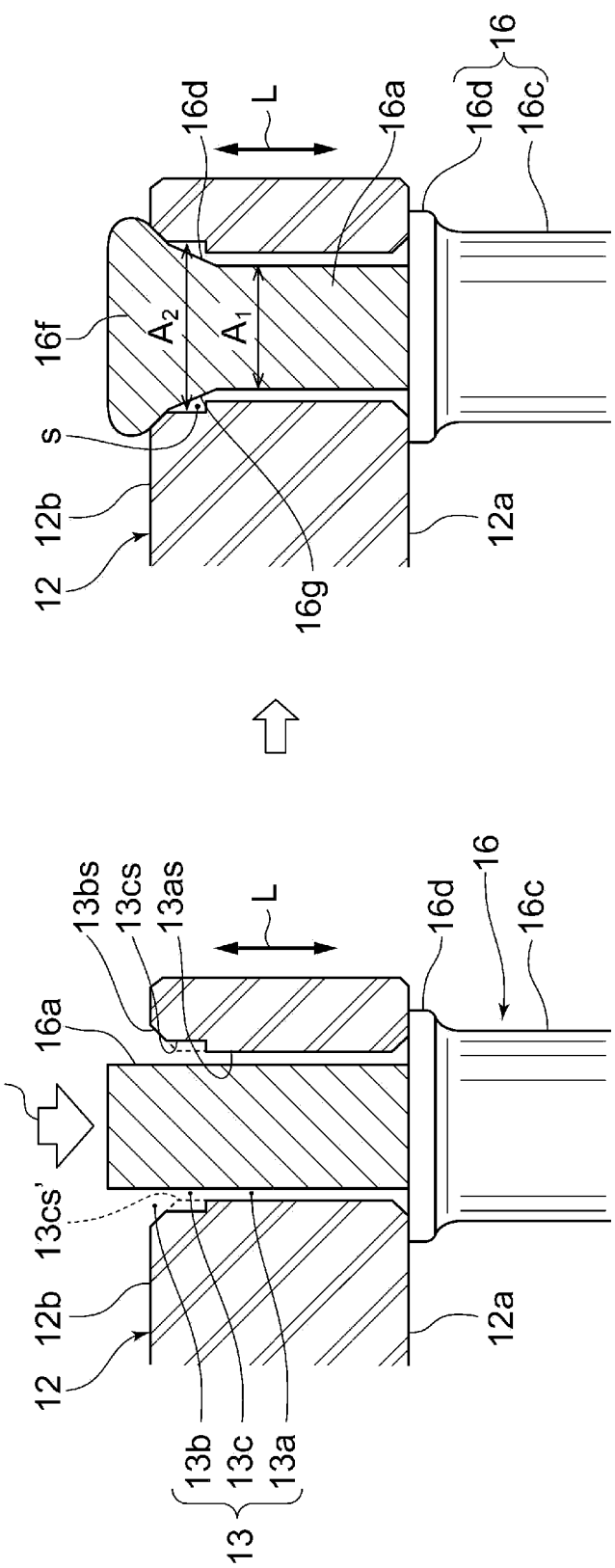
FIG. 5 is a cross-sectional view of a caulking portion of the nozzle plate according to an embodiment.

As shown in FIG. 5, the nozzle plate 2 has a through hole 13 into which an end portion of the at least one nozzle support 16 (corresponding to a nozzle plate coupling portion 16a in FIG. 5) is inserted, and the through hole 13 includes a straight portion 13a extending from the one surface 12a (the surface on the side of the nozzle mount 14) toward another surface 12b of the nozzle plate 12, an enlarged diameter portion 13b formed on a side of the another surface 12b of the nozzle plate 12 and having a larger diameter than the straight portion 13a, and a relief processing portion 13c which is formed in a part of the straight portion 13a continuing into the enlarged diameter portion 13b. The relief processing portion 13c has a larger diameter than another part of the straight portion 13a where the relief processing portion 13c is not formed. Therefore, in the nozzle plate 12, a straight portion forming surface 13as, an enlarged diameter portion forming surface 13bs, and a relief processing portion forming surface 13cs are formed. In FIG. 5, reference character 13cs′ denotes a through hole forming surface when the relief processing portion 13c is not formed.

The nozzle plate coupling portion 16a is inserted into the through hole 13, an end portion of the nozzle plate coupling portion 16a protrudes from an opening on the side of the surface 12b of the through hole 13, and a caulking load G is loaded on the protruding portion to perform caulking processing. With caulking processing, the end portion of the nozzle plate coupling portion 16a is deformed until being brought into contact with the enlarged diameter portion forming surface 13bs, and forms a caulking portion 16f. Since the relief processing portion 13c is formed in the part of the straight portion 13a continuing into the enlarged diameter portion 13b, the through hole 13 does not contact the relief processing portion forming surface 13cs even if a part (non-caulking portion 16g) of the nozzle plate coupling portion 16a continuing into the caulking portion 16f is deformed to the side of the relief processing portion forming surface 13cs of the through hole 13 in caulking processing. Therefore, there is no contact section to be a starting point for fretting fatigue to occur, making it possible to suppress occurrence of fretting fatigue in the nozzle support 16.

In the embodiment shown in FIG. 5, a part of the caulking portion 16f has a shape protruding from the surface 12b of the nozzle plate 12. In another embodiment, the caulking portion 16f forms a smooth surface connected to the surface 12b.

Figure 8:
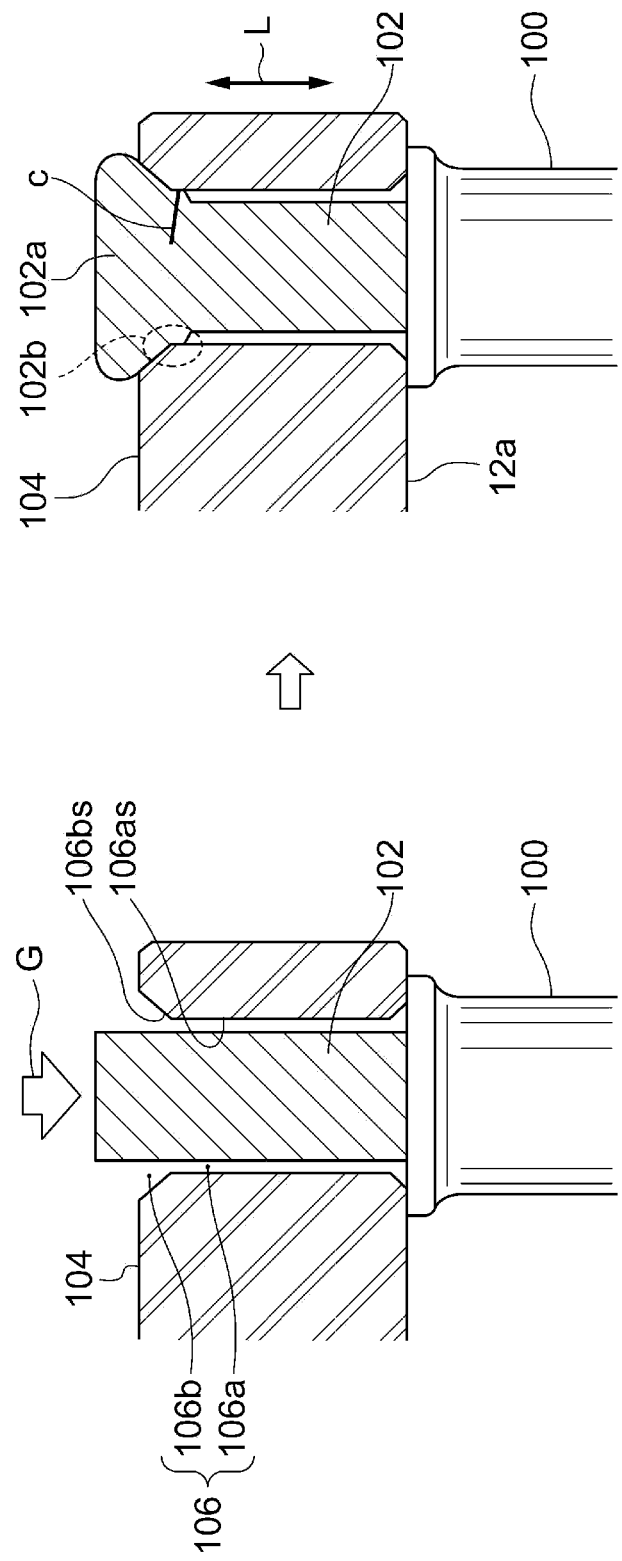
FIG. 8 is a cross-sectional view of a caulking portion of a nozzle support in the conventional variable nozzle device.

FIG. 8 shows a case where a nozzle support 100 is fixed to a nozzle plate 104 by caulking in the conventional variable nozzle device. A through hole 106 formed in the nozzle plate 104 includes a straight portion 106a and an enlarged diameter portion 106b formed in an opening portion. In the nozzle plate 104, a straight portion forming surface 106as and an enlarged diameter portion forming surface 106bs are formed. A nozzle plate coupling portion 102 is inserted into the through hole 106, and the caulking load G is loaded on a tip portion of the nozzle plate coupling portion 102 to perform caulking processing. With caulking processing, a caulking portion 102a is formed, and the caulking portion 102a is deformed (enlarged in diameter) and in contact with the enlarged diameter portion 106b. The relief processing portion 13c is not formed in the through hole 106 as in the above-described embodiment, and thus a part (non-caulking portion 102b) of the nozzle plate coupling portion 102 continuing into the caulking portion 102a may be deformed by caulking processing and may contact a part of the straight portion forming surface 106as. If the non-caulking portion 102b contacts the part of the straight portion forming surface 106as, a vibration load L is applied to the non-caulking portion 102b from the nozzle plate 104, which may cause a fretting fatigue crack c originating from an end portion of the non-caulking portion 102b. If the fretting fatigue crack c is caused, a fatigue limit is decreased significantly.

In an embodiment, as shown in FIG. 3, the nozzle support 16 basically has a cylindrical shape, and the nozzle plate coupling portion 16a and the nozzle mount coupling portion 16b are formed to each have a minimum diameter. An axial center portion 16c facing the nozzle flow passage F (F$_2$) is formed to have a larger diameter than the nozzle plate coupling portion 16a and the nozzle mount coupling portion 16b. The nozzle plate 12 and the nozzle mount 14 are locked to a step formed between the axial center portion 16c, and the nozzle plate coupling portion 16a and the nozzle mount coupling portion 16b, positioning the nozzle plate 12 and the nozzle mount 14.

In an embodiment, flange portions 16d and 16e each having a larger diameter than the center portion 16c are, respectively, formed at axially both side portions of the center portion 16c, and the nozzle plate 12 and the nozzle mount 14 are locked to the flange portions 16d and 16e, respectively, and are positioned.

The above-described embodiment is an example where the nozzle support 16 is fixed to the nozzle plate 12 by caulking. However, as shown in FIG. 3, the nozzle support 16 may be fixed to the nozzle mount 14 by caulking. In this case, the nozzle mount coupling portion 16b is inserted into a through hole 14b formed in the nozzle mount 14, and a tip portion of the nozzle mount coupling portion 16b undergoes caulking processing and forms a caulking portion 16h. The caulking portion 16h is in contact with an enlarged diameter portion forming surface formed in an outlet opening of the through hole 14b.

In an embodiment, as shown in FIG. 3, the nozzle plate 12 is formed into an annular shape and a substantially plate shape. More specifically, the nozzle plate 12 includes an annular and plate-like body portion, and an extending portion 12c extending to an opposite side (right side in FIG. 1) to the nozzle mount 14 to be along an outer circumferential shape of the turbine rotor 42 from an inner circumferential edge portion of the body portion. The extending portion 12c is formed integrally with the body portion. Further, in the body portion, as many through holes 13 for locking the nozzle plate coupling portions 16a as the nozzle supports 16 are formed. In the embodiment shown in FIG. 4, the four through holes 13 are formed at intervals of 90° in the circumferential direction of the nozzle plate 12.

In an embodiment, as shown in FIG. 3, the nozzle mount 14 is formed into the annular shape and the substantially plate shape, supports the nozzle vane 18 in an inner circumferential side portion, and is coupled to the nozzle support 16 in an outer circumferential side portion. That is, as many columnar through holes 14a for rotatably supporting nozzle shafts 18a of the nozzle vanes 18 as the nozzle vanes 18 are formed in the inner circumferential side portion, and as many through holes 14b for locking the nozzle mount coupling portions 16b as the nozzle supports 16 are formed in the outer circumferential side portion. The through holes 14b are disposed at circumferential positions corresponding to the through holes 13 of the nozzle plate 12, respectively.

In an embodiment, as shown in FIG. 3, the variable nozzle device 10 includes a nozzle vane variable part 20. The nozzle vane variable part 20 includes at least one lever plate 22 and a drive ring 24, and is disposed in the interior space Si. As many lever plates 22 as the nozzle vanes 18 are disposed and in a case where a plurality of lever plates 22 are disposed, the lever plates 22 are disposed to be spaced apart from each other at intervals on the circumference, as shown in FIG. 2. Further, the lever plate 22 is coupled at one end to a protruding portion of the nozzle shaft 18a protruding into the interior space Si and is connected at another end to the drive ring 24. The drive ring 24 is formed into an annular shape and a plate shape, and is placed such that an inner circumferential surface thereof faces a stepped surface formed between the outer circumferential side portion and inner circumferential side portion of the nozzle mount 14. Further, the drive ring 24 is disposed to be rotatable about the nozzle mount 14.

Thus, the nozzle vane variable part 20 rotates the drive ring 24 by a predetermined angle, thereby operating the lever plate 22 in conjunction with the drive ring 24 and making it possible to change a vane angle of the nozzle vane 18. Further, the variable nozzle device 10 can increase/decrease a flow-passage area of the exhaust gas supplied to the turbine rotor 42 by changing the vane angle of the nozzle vane 18, and along therewith, adjusts the flow velocity of the exhaust gas supplied to the turbine rotor 42 and the supply amount to the turbine rotor 42, making it possible to regulate a boost pressure of air supplied to the engine.

Figure 6:
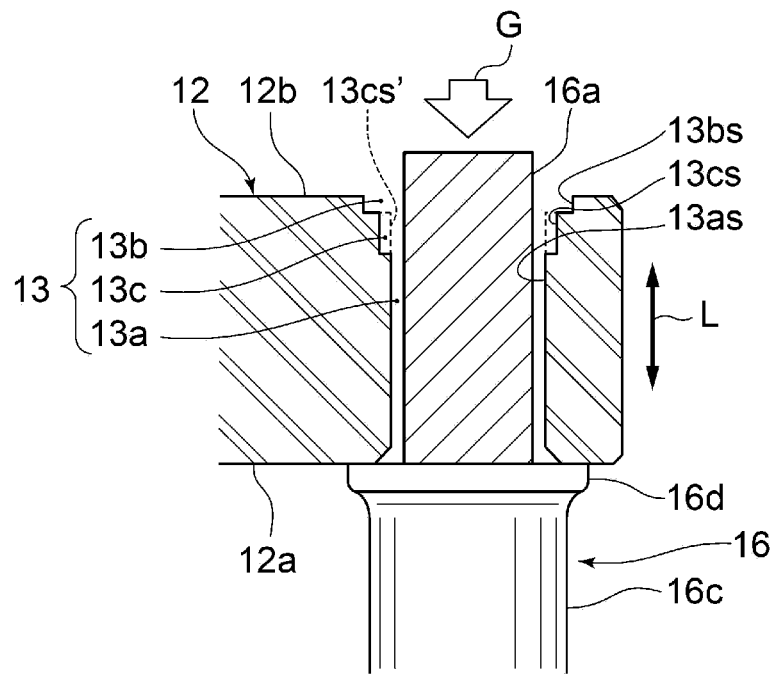
FIG. 6 is a cross-sectional view of a coupling portion of the nozzle plate before caulking processing.

In an embodiment, as shown in FIG. 5, the enlarged diameter portion forming surface 13bs forms a tapered surface oblique to the axial direction of the nozzle plate coupling portion 16a. Further, in another embodiment, as shown in FIG. 6, the enlarged diameter portion forming surface 13bs may form a rectangular cross-section having a surface orthogonal and parallel to the axial direction of the nozzle plate coupling portion 16a. Alternatively, the enlarged diameter portion forming surface 13bs may form another cross-sectional shape such as a circular shape or an oval shape.

Figure 7:
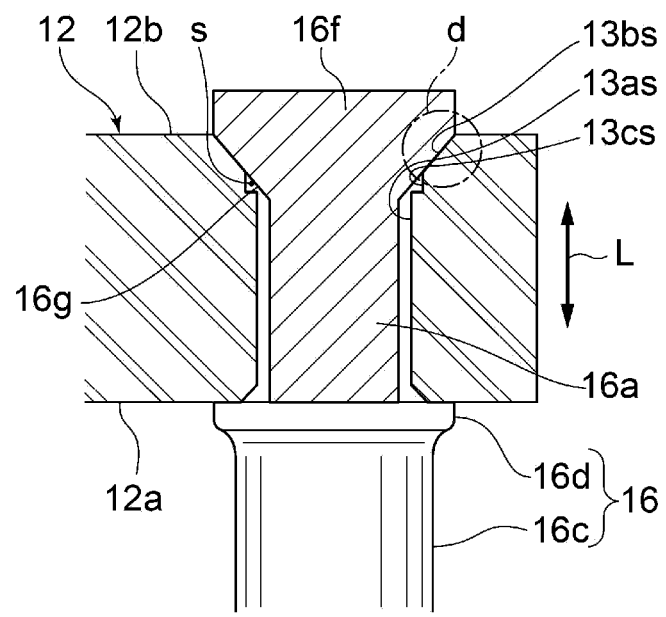
FIG. 7 is a cross-sectional view of the caulking portion of the nozzle plate according to an embodiment.

In an embodiment shown in FIG. 7, a contact area of a chamfered portion d (a contact section of the caulking portion 16f and the enlarged diameter portion forming surface 13bs) of the enlarged diameter portion forming surface 13bs with the tapered surface shown in FIG. 5 is increased. Thus, it is possible to increase a strength of the chamfered portion d with respect to the vibration load L applied to the nozzle plate coupling portion 16a from the nozzle plate 12.

Figure 4:
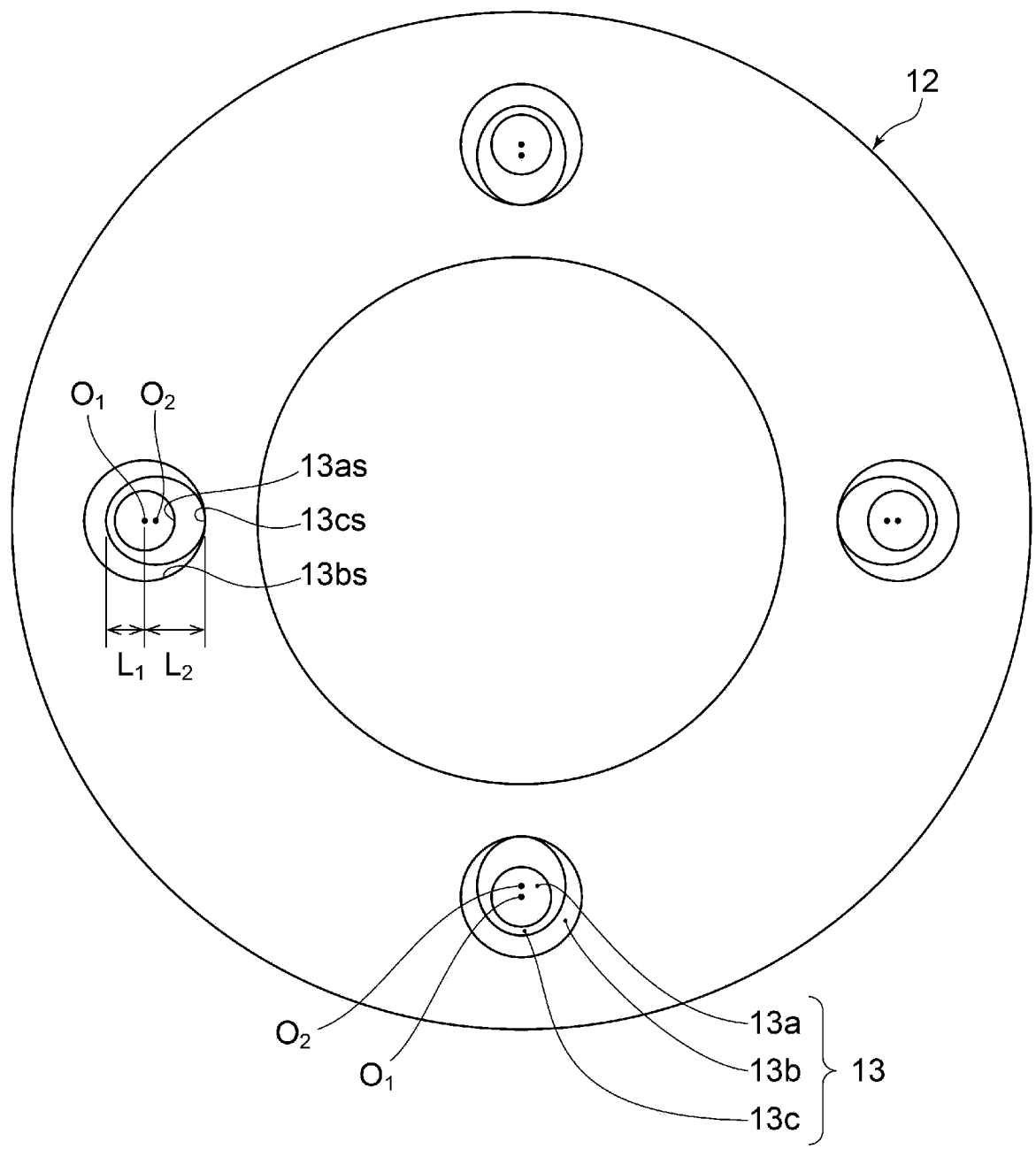
FIG. 4 is a front view of a nozzle plate according to an embodiment.

In an embodiment, as shown in FIG. 4, the relief processing portion 13c is formed such that of distances $L_1$ and $L_2$ between a center $O_1$ of the through hole 13 and surfaces forming the relief processing portion 13c, the radially inner distance $L_2$ is greater than the radially outer distance $L_1$ of the nozzle plate 12 ($L_1 < L_2$). According to the present embodiment, even if the nozzle support 16 is thermally elongated and increased in diameter under a high-temperature environment, the non-caulking portion 16g does not contact the straight portion forming surface 13as of the through hole 13. Thus, it is possible to suppress occurrence of fretting fatigue in the nozzle support 16.

In an embodiment, as shown in FIG. 4, the relief processing portion 13c is formed such that a center $O_2$ of the relief processing portion 13c is at a position offset to the radially inner side of the nozzle plate 12 relative to the center $O_1$ of the through hole 13. According to the present embodiment, if the relief processing portion 13c is processed, positioning the center axis of a cutting blade at the position offset from the center $O_1$ to the center $O_2$ of the through hole 13, it is possible to easily process the relief processing portion 13c.

In an embodiment, as shown in FIG. 5, relative to an outer diameter $A_1$ of the nozzle plate coupling portion 16a, an inner diameter $A_2$ of the relief processing portion 13c is in a relation of $A_2 = 1.1 \times A_1$ to $1.5 \times A_1$. According to the present embodiment, since $A_2/A_1 = 1.1$ to $1.5$, it is possible to suppress contact of the non-caulking portion 16g with a part of the straight portion forming surface 13as without expansion formation of the relief processing portion 13c more than necessary. Thus, it is possible to suppress occurrence of fretting fatigue in the nozzle support 16.

In an embodiment, the relief processing portion 13c is formed such that the inner diameter $A_2$ of the relief processing portion 13c is smaller than a maximum diameter of the enlarged diameter portion 13b. Thus, the relief processing portion 13c is easily processed when the relief processing portion 13c is cut from the side of the surface 12b.

In an embodiment, as shown in FIGS. 5 and 7, the nozzle plate coupling portion 16a of the nozzle support 16 is configured to include the caulking portion 16f contacting the enlarged diameter portion forming surface 13bs, and the non-caulking portion 16g disposed to have a gap s between the non-caulking portion 16g and the straight portion forming surface 13as continuing into the enlarged diameter portion forming surface 13bs. According to the present embodiment, since there is the gap s between the non-caulking portion 16g and a part of the straight portion forming surface 13as facing the non-caulking portion 16g, and there is no contact section to be the starting point for fretting fatigue to occur, it is possible to suppress occurrence of fretting fatigue in the nozzle plate coupling portion 16a.

In an embodiment, as shown in FIGS. 5 and 7, the enlarged diameter portion forming surface 13bs is formed into a tapered shape. According to the present embodiment, since the enlarged diameter portion forming surface 13*bs* is formed into the tapered shape, it is possible to increase the diameter of the caulking portion 16*f* formed in the nozzle plate coupling portion 16*a* along the tapered surface of the enlarged diameter portion forming surface 13*bs* in caulking processing. Thus, it is possible to reduce a load necessary for caulking processing which is applied to the nozzle support 16 in caulking processing, making it possible to suppress deformation of the non-caulking portion 16*g* to the side of the relief processing portion forming surface 13*cs*.

In an embodiment, as a material forming the nozzle plate 12, a material with a thermal expansion coefficient which is larger than a thermal expansion coefficient of a material forming the nozzle support 16 is selected. Thus, if a temperature of the variable nozzle device 10 increases under the high-temperature environment, it is possible to suppress backlash caused between the nozzle plate 12 and the nozzle support 16.

In an embodiment, when the nozzle mount 14 and the nozzle support 16 are fixed by caulking, as the material forming the nozzle mount 14, the material with the thermal expansion coefficient which is larger than the thermal expansion coefficient of the material forming the nozzle support 16 is selected. Thus, if the temperature of the variable nozzle device 10 increases under the high-temperature environment, it is possible to suppress backlash caused between the nozzle mount 14 and the nozzle support 16.

Since the exhaust turbocharger 40 includes the variable nozzle device 10 according to some embodiments described above, it is possible to suppress occurrence of fretting fatigue in the caulking portion where the nozzle plate coupling portion 16*a* or the nozzle mount coupling portion 16*b* is fixed to the nozzle plate 12 or the nozzle mount 14 by caulking. Thus, it is possible to suppress the fretting fatigue crack of the nozzle support 16 and to prevent fatigue failure.

The above-described embodiments are applied to the variable nozzle device 10 capable of changing the vane angle of the nozzle vane 18 and the variable-displacement type exhaust turbocharger 40 including the variable nozzle device 10, and another embodiment can be applied to a fixed nozzle device where the vane angle of the nozzle vane 18 is fixed and a fixed-displacement type exhaust turbocharger including the fixed nozzle device.

INDUSTRIAL APPLICABILITY

According to some embodiments, in a nozzle device, it is possible to suppress occurrence of fretting fatigue in a nozzle support fixed to a nozzle plate and a nozzle mount by caulking.

REFERENCE SIGNS LIST

10 Variable nozzle device
10*a* Axis
12, 104 Nozzle plate
12*c* Extending portion
13, 106 Through hole
13*a*, 106*a* Straight portion
13*b*, 106*b* Enlarged diameter portion
13*c* Relief processing portion
13*as*, 106*as* Straight portion forming surface
13*bs*, 106*bs* Enlarged diameter portion forming surface
13*cs* Relief processing portion forming surface
14 Nozzle mount
14*a*, 14*b* Through hole
16, 100 Nozzle support
16*a*, 102 Nozzle plate coupling portion
16*f*, 16*h*, 102*a* Caulking portion
16*b* Nozzle mount coupling portion
16*c* Axial center portion
16*d*, 16*e* Flange portion
16*g*, 102*b* Non-caulking portion
18 Nozzle vane
18*a* Nozzle shaft
20 Nozzle vane variable portion
22 Lever plate
24 Drive ring
40 Variable-displacement type exhaust turbocharger
42 Turbine rotor
42*a* Rotational shaft
44 Turbine housing
46 Bearing
46 Bearing housing
48 Exhaust outlet
50 F Exhaust gas flow passage
F ($F_1$) Scroll flow passage
F ($F_2$) Nozzle flow passage
G Caulking load
L Vibration load
$O_1$, $O_2$ Center
Si Interior space
d Chamfered portion
f Flow of exhaust gas
s Gap

The invention claimed is:

1. A nozzle device, comprising:
an annular nozzle plate;
an annular nozzle mount defining a nozzle flow passage between the nozzle mount and one surface of the nozzle plate;
at least one nozzle support coupling the nozzle plate and the nozzle mount, and fixed to at least the nozzle plate by caulking; and
at least one nozzle vane supported between the nozzle plate and the nozzle mount,
wherein the nozzle plate has a through hole into which an end portion of the at least one nozzle support is inserted, and
wherein the through hole includes:
a straight portion extending from the one surface toward another surface of the nozzle plate;
an enlarged diameter portion formed on a side of the another surface of the nozzle plate and having a larger diameter than the straight portion; and
a relief processing portion which is formed in a part of the straight portion continuing into the enlarged diameter portion and has a larger diameter than another part of the straight portion where the relief processing portion is not formed, the relief processing portion having a constant diameter and extending along an extending direction of the through hole.

2. The nozzle device according to claim 1,
wherein a surface forming the enlarged diameter portion is formed into a tapered shape.

3. The nozzle device according to claim 1,
wherein the nozzle mount is fixed to a bearing housing, and
wherein the nozzle plate is supported by the nozzle mount via the nozzle support.

4. An exhaust turbocharger, comprising:
the nozzle device according to claim 1.

5. A nozzle device, comprising:
an annular nozzle plate;

an annular nozzle mount defining a nozzle flow passage between the nozzle mount and one surface of the nozzle plate;
at least one nozzle support coupling the nozzle plate and the nozzle mount, and fixed to at least the nozzle plate by caulking; and
at least one nozzle vane supported between the nozzle plate and the nozzle mount,
wherein the nozzle plate has a through hole into which an end portion of the at least one nozzle support is inserted,
wherein the through hole includes:
  a straight portion extending from the one surface toward another surface of the nozzle plate; and
  an enlarged diameter portion formed on a side of the another surface of the nozzle plate and having a larger diameter than the straight portion, and
wherein the at least one nozzle support includes:
  a caulking portion which contacts a surface forming the enlarged diameter portion; and
  a non-caulking portion which is disposed with a gap between the non-caulking portion and a surface forming a part of the straight portion continuing into the enlarged diameter portion.

6. The nozzle device according to claim 5, wherein a surface forming the enlarged diameter portion is formed into a tapered shape.

7. The nozzle device according to claim 5, wherein the nozzle mount is fixed to a bearing housing, and
wherein the nozzle plate is supported by the nozzle mount via the nozzle support.

8. The nozzle device according to claim 5, wherein the nozzle plate has a thermal expansion coefficient which is larger than a thermal expansion coefficient of the nozzle support.

9. An exhaust turbocharger, comprising:
the nozzle device according to claim 5.

10. A nozzle device, comprising:
an annular nozzle plate;
an annular nozzle mount defining a nozzle flow passage between the nozzle mount and one surface of the nozzle plate;
at least one nozzle support coupling the nozzle plate and the nozzle mount, and fixed to at least the nozzle plate by caulking; and
at least one nozzle vane supported between the nozzle plate and the nozzle mount,
wherein the nozzle plate has a through hole into which an end portion of the at least one nozzle support is inserted, and
wherein the through hole includes:
  a straight portion extending from the one surface toward another surface of the nozzle plate;
  an enlarged diameter portion formed on a side of the another surface of the nozzle plate and having a larger diameter than the straight portion; and
  a relief processing portion which is formed in a part of the straight portion continuing into the enlarged diameter portion and has a larger diameter than another part of the straight portion where the relief processing portion is not formed,
wherein,
when L1 is a distance between a center of the through hole and the radially outermost position, with respect to the nozzle plate, in a relief processing portion forming surface forming the relief processing portion,
when L2 is a distance between the center of the through and the radially innermost position, with respect to the nozzle plate, in the relief processing portion forming surface, and
wherein a relationship L1<L2 is satisfied.

11. The nozzle device according to claim 10, wherein a center of the relief processing portion is at a position offset to the radially inner side of the nozzle plate relative to the center of the through hole.

12. A nozzle device, comprising:
an annular nozzle plate;
an annular nozzle mount defining a nozzle flow passage between the nozzle mount and one surface of the nozzle plate;
at least one nozzle support coupling the nozzle plate and the nozzle mount, and fixed to at least the nozzle plate by caulking; and
at least one nozzle vane supported between the nozzle plate and the nozzle mount,
wherein the nozzle plate has a through hole into which an end portion of the at least one nozzle support is inserted, and
wherein the through hole includes:
  a straight portion extending from the one surface toward another surface of the nozzle plate;
  an enlarged diameter portion formed on a side of the another surface of the nozzle plate and having a larger diameter than the straight portion; and
  a relief processing portion which is formed in a part of the straight portion continuing into the enlarged diameter portion and has a larger diameter than another part of the straight portion where the relief processing portion is not formed, and
wherein the relief processing portion has an inner diameter $A_2$ which is not less than $1.1 \times A_1$ and not greater than $1.5 \times A_1$, where $A_1$ is an outer diameter of the nozzle support.

13. A nozzle device, comprising:
an annular nozzle plate;
an annular nozzle mount defining a nozzle flow passage between the nozzle mount and one surface of the nozzle plate;
at least one nozzle support coupling the nozzle plate and the nozzle mount, and fixed to at least the nozzle plate by caulking; and
at least one nozzle vane supported between the nozzle plate and the nozzle mount,
wherein the nozzle plate has a through hole into which an end portion of the at least one nozzle support is inserted, and
wherein the through hole includes:
  a straight portion extending from the one surface toward another surface of the nozzle plate;
  an enlarged diameter portion formed on a side of the another surface of the nozzle plate and having a larger diameter than the straight portion; and
  a relief processing portion which is formed in a part of the straight portion continuing into the enlarged diameter portion and has a larger diameter than another part of the straight portion where the relief processing portion is not formed, and
wherein the nozzle plate has a thermal expansion coefficient which is larger than a thermal expansion coefficient of the nozzle support.

* * * * *